United States Patent
Osterberg

(10) Patent No.: US 7,468,646 B2
(45) Date of Patent: Dec. 23, 2008

(54) BI-STABLE MAGNETIC LATCH ASSEMBLY

(75) Inventor: David A. Osterberg, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 162 days.

(21) Appl. No.: 11/448,382

(22) Filed: Jun. 6, 2006

(65) Prior Publication Data

US 2007/0279168 A1 Dec. 6, 2007

(51) Int. Cl.
*H01H 9/00* (2006.01)
(52) U.S. Cl. .................. 335/179; 335/207
(58) Field of Classification Search ........... 335/272; 292/251.5; 385/16, 17, 18, 20
See application file for complete search history.

(56) References Cited

U.S. PATENT DOCUMENTS

| 4,090,745 | A | | 5/1978 | Dohogne et al. |
| 4,387,357 | A | * | 6/1983 | Mandel et al. ............... 335/272 |
| 4,864,264 | A | * | 9/1989 | Gamble ....................... 335/234 |
| 6,633,212 | B1 | | 10/2003 | Ruan et al. |
| 7,013,057 | B2 | * | 3/2006 | Osterberg .................... 385/16 |
| 2003/0179982 | A1 | | 9/2003 | Osterberg |
| 2004/0108777 | A1 | * | 6/2004 | Yen et al. .................. 310/68 R |
| 2004/0183383 | A1 | * | 9/2004 | Strobl ......................... 310/36 |
| 2005/0029819 | A1 | * | 2/2005 | Osterberg ................. 292/251.5 |
| 2005/0047709 | A1 | | 3/2005 | Smith |

FOREIGN PATENT DOCUMENTS

| GB | 2182747 A | 5/1987 |
| WO | 2007106163 A2 | 9/2007 |

OTHER PUBLICATIONS

PCT Search Report, PCT/US2007/070376 dated Jan. 14, 2008.

* cited by examiner

*Primary Examiner*—Elvin Enad
*Assistant Examiner*—Alexander Talpalatskiy
(74) *Attorney, Agent, or Firm*—Ingrassia, Fisher & Lorenz, P.C.

(57) ABSTRACT

A bi-stable magnetic switch assembly is provided that comprises a stator and a rotor, which is configured for rotation with respect to the stator between a first latched position and a second latched position. The stator and the rotor cooperate to form a first magnetic path and a magnetic path having a shared portion. A spring, which is coupled to the rotor, biases the rotor toward the first and second latched positions when the rotor is in the second and first latched positions, respectively. At least one magnet is fixedly coupled to either the stator or the rotor. The magnet is included within the first magnetic path and configured to produce a magnetic latching force that biases the rotor toward first latched position when the rotor is closer to the first latched position than to the second latched position, and toward the second latched position when the rotor is closer to the second latched position than to the first latched position. At least one coil is fixedly coupled to either the stator or the rotor and, when energized, alters the flux in the second magnetic path to reduce the magnetic latching force.

15 Claims, 9 Drawing Sheets

BI-STABLE MAGNETIC LATCH ASSEMBLY

STATEMENT REGARDING FEDERALLY SPONSORED RESEARCH OR DEVELOPMENT

This invention was made with Government support under ZAS1FN18 awarded by Raytheon. The Government has certain rights in this invention.

TECHNICAL FIELD

The present invention relates to a magnetic latch and, more particularly, to an energy-efficient, bi-stable magnetic latch assembly particularly suited for use as a spring-biased optical switch.

BACKGROUND

Optical switching assemblies designed to switch one or more optical elements (e.g., various lenses) into and out of an optical path are known and may be utilized in, for example, satellite applications. One relatively familiar type of optical switching system employs a processor, a motor, and a wheel mechanism having a plurality of optical elements disposed along its perimeter. The processor is coupled to the motor, which is, in turn, coupled to the wheel mechanism. An optical path passes through a portion of the wheel's perimeter such that the wheel may be rotated by the motor about the wheel's central axis to position a given optical element within the optical path. To move the optical element into the optical path, the processor first establishes the current rotational position of the wheel and subsequently determines the rotational adjustment required to move the desired optical element into the optical path. The processor then commands the motor to perform the required adjustment.

Unfortunately, in such known systems, the rotational movement of the wheel may cause disturbances (e.g., vibrations) in the system, which may lead to image blurring and difficulty implementing precise optical controls. Additionally, the assembly of the optical elements along the perimeter of such wheel mechanisms provides for sequential, rather than random, element access. As a result, the amount of energy required to move one element into and another element out of the optical path is often undesirably high, especially when the newly selected optical element is disposed opposite the formally selected element.

To help mitigate the above-noted drawbacks, specialized optical element switch assemblies have been developed. Individual switch assemblies of this type may comprise a spring-biased pivot shaft coupled to an actuator arm having an optical element included thereon (e.g., coupled to one end thereof). The pivot shaft biases the actuator arm between first and second latched positions, which may position the optical element within and outside of the optical path, respectively. When the arm is held in one of the latched positions, the spring-biased pivot shaft exerts a rotational force on the arm in the direction of the other latched position. Thus, when released from a latched position at which it has been held, the actuator arm will swing under the influence of the pivot shaft toward the other latched position. Due to unavoidable system losses, the spring-biased pivot shaft will not provide enough energy to fully rotate the arm to the other latched position. Therefore, a latch mechanism is provided to help complete the arm's rotation and secure the arm at the other latched position against the force of spring-based pivot shaft. This mechanism may be mechanical, but is preferably magnetic.

With reference to the later, a magnetic latch mechanism may comprise a permanent magnet configured to attract and physically engage a portion of the arm (e.g., a terminal end of the arm opposite the optical element), which may also be equipped with a magnet. This configuration is advantageous in that the arm may be held in a desired position for an indefinite period of time with little power consumption. To release the arm from a latched position, a control coil may be provided around a magnet disposed on the actuator arm or the magnet employed by the magnetic latch so as to form an electromagnet. When current is delivered to the coil, a magnetic field is generated counter to the field produced by the magnetic latch mechanism, and the actuator arm is released. The actuator arm then rotates under the force of the spring-biased pivot shaft toward the opposite latched position. A second magnetic latch mechanism, which again provides the additional energy required to fully rotate the arm, then physically engages the arm and secures it at the other latched position.

For the above described reasons, optical element switch assemblies employing spring-biased pivot shafts represent a considerable improvement over assemblies employing wheel-based mechanisms. However, the operation of such assemblies still consumes an undesirably large amount of power. More specifically, the electrical current delivered to a control coil must be relatively large to generate a magnetic field of sufficient magnitude to release an arm from a latched position, largely because the magnetic flux generated by the coil travels substantially the same path traveled by the flux emitted by the latching mechanism's permanent magnets.

In view of the above, it should be appreciated that it would be desirable to provide an energy-efficient magnetic switch assembly (e.g., an optical switch assembly) that requires less power to release an actuator arm from a latched position. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a bi-stable magnetic switch assembly that comprises a stator and a rotor, which is configured for rotation with respect to the stator between a first latched position and a second latched position. The stator and the rotor cooperate to form a first magnetic path and a magnetic path having a shared portion. A spring, which is coupled to the rotor, biases the rotor toward the first and second latched positions when the rotor is in the second and first latched positions, respectively. At least one magnet is fixedly coupled to either the stator or the rotor. The magnet is included within the first magnetic path and configured to produce a magnetic latching force that biases the rotor toward first latched position when the rotor is closer to the first latched position than to the second latched position, and toward the second latched position when the rotor is closer to the second latched position than to the first latched position. At least one coil is fixedly coupled to either the stator or the rotor and, when energized, alters the flux in the second magnetic path to reduce the magnetic latching force.

The foregoing and other objects, features and advantages of the preferred switch assembly will be apparent from the following more particular description of a preferred embodiment of the invention, as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
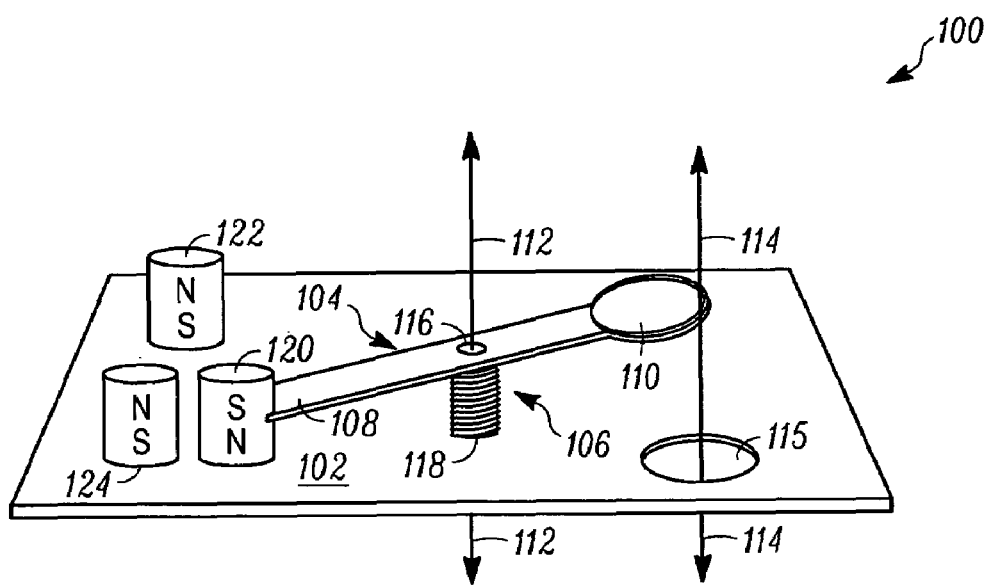
FIGS. 1 and 2 are isometric views illustrating a magnetic latch assembly in a first latched position and a second latched position, respectively.
Figure 2:
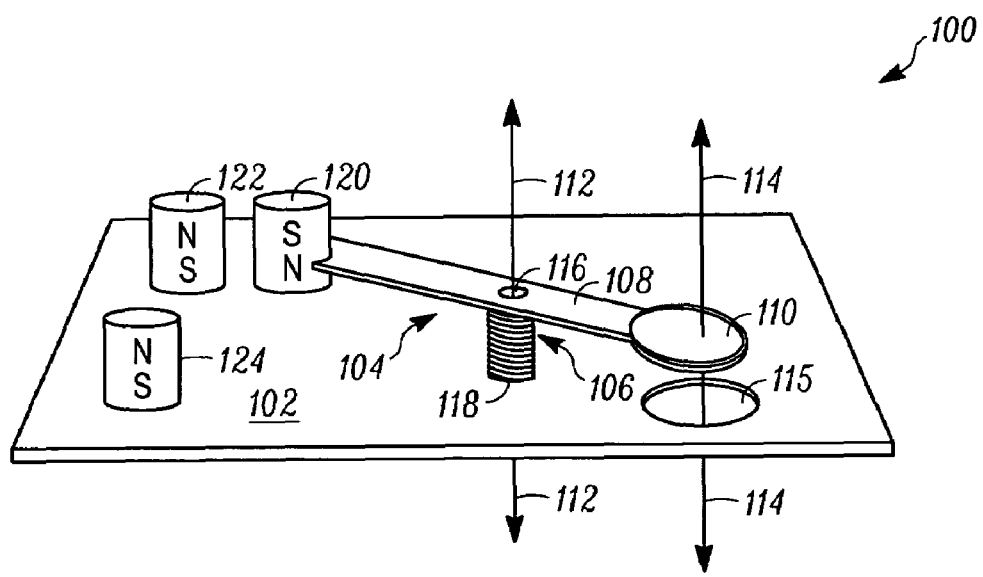
Figure 4:
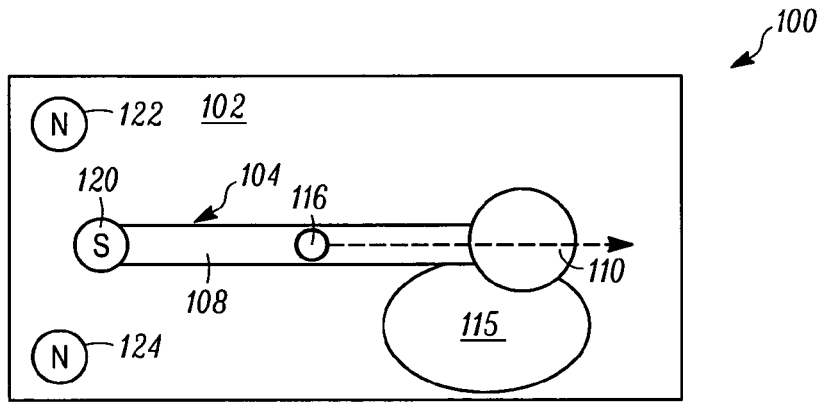
Figure 5:
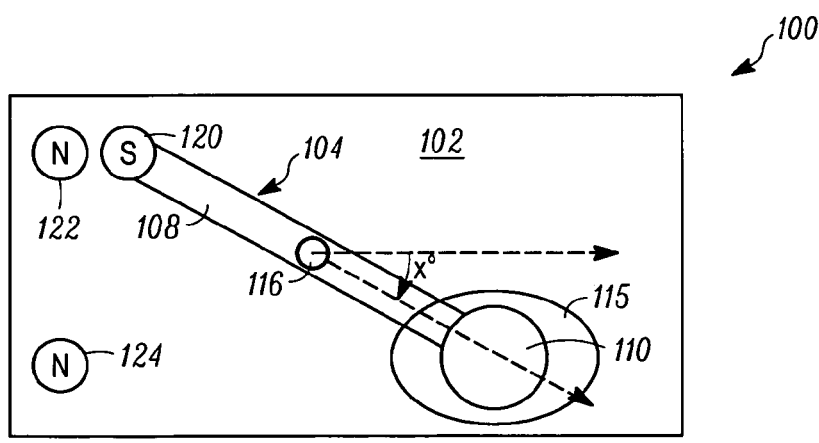

FIGS. 1 and 2 are isometric views of a simplified bi-stable, non-contacting magnetic latch assembly 100 in first and second latched positions, respectively. Magnetic latch assembly 100 is further illustrated in FIGS. 3-5, which are top views of assembly 100 in the first latched position, an intermediate rotational position, and the second latched position, respectively. Latch assembly 100 comprises a stator 102 and a rotor 104, which, in turn, comprises a spring-biased pivot mechanism 106 and an actuator arm 108 having an optical element (e.g., a filter, mirror, optical source, etc.) 110 coupled to an end thereof. Actuator arm 108 may be any structural member that may accept optical element 110 and that has sufficient rigidly to effectively control the position thereof. Rotor 104 is configured to rotate relative to stator 102 about an axis 112 to move optical element 110 into and out of an optical path 114, which passes through an aperture 115 provided through stator 102. In the depicted embodiment, optical element 110 is disposed outside of optical path 114 when rotor 104 is in the first latched position (FIGS. 1 and 3) and inside of optical path 114 when rotor 104 is in the second latched position (FIGS. 2 and 5).

Figure 3:
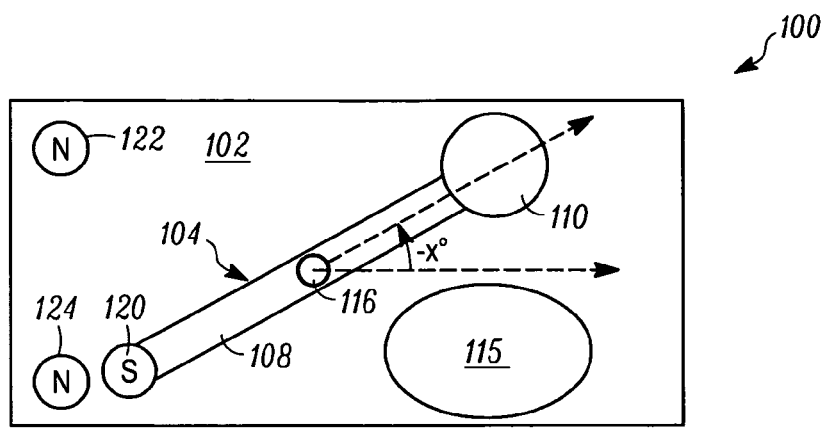
FIGS. 3-5 are functional top views of the assembly shown in FIGS. 1 and 2 in the first latched position, an intermediate rotational position, and the second latched position, respectively.

As is most clearly shown in FIGS. 1 and 2, pivot mechanism 106 includes a rotatable shaft 116 and a spring (e.g., a torsion bar spring) 118, which is disposed around shaft 116 and fixedly coupled to actuator arm 108 and to stator 102 at, for example, opposite ends thereof. Spring 118 biases rotor 104 to the intermediate rotational position (FIG. 4) between the first latched position (FIGS. 1 and 3) and the second latched position (FIGS. 2 and 5). Thus, when rotor 104 is in the first latched position (FIGS. 1 and 3), spring 118 exerts a rotational force on rotor 104 in the direction of the second latched position (FIGS. 2 and 5). Conversely, when rotor 104 is in the second latched position (FIGS. 2 and 5), spring 118 exerts a rotational force on rotor 104 in the direction of the first latched position (FIGS. 1 and 3). Considering this, it should be appreciated that, if the rotational movement of rotor 104 was dictated entirely by pivot mechanism 106 and if rotor 104 was physically moved to either of the latched positions and then released, rotor 104 would oscillate in a region between the latched positions before ultimately coming to rest at the intermediate rotational position illustrated in FIG. 4. As will be seen, however, latch assembly 100 is configured to magnetically catch and hold rotor 104 at the latched positions until released.

To accomplish the above-described magnetic latching action, two or more stator magnetic regions (referred to as "magnets" hereafter for simplicity) are provided at spaced intervals along stator 102 and at least one rotor magnetic region (again, referred to as a "magnet" hereafter for simplicity) is provided on rotor 104 and disposed so as to be attracted to the stator magnetic region. In latch assembly 100, for example, two stator magnets 122 and 124 are disposed on stator 102 generally opposite aperture 115, and one rotor magnet 120 is fixedly coupled to an end of arm 108 opposite optical element 110. Stator magnets 124 and 122 are disposed on stator 102 such that their north and south poles reside proximate the respective south and north poles of rotor magnet 120 when in the first and second latched positions, respectively. When rotor 104 rotates in the first latched position (FIGS. 1 and 3), rotor magnet 120 rotates along therewith into a position adjacent stator magnet 124. Similarly, when rotor 104 rotates into the second latched position (FIGS. 2 and 5), rotor magnet 120 rotates into a position adjacent stator magnet 122. Though rotor magnet 120 is shown as not contacting stator magnet 120 or 122 in either the first or the second latched position, respectively, it should be appreciated that assembly 100 may be configured such that rotor magnet 120 does contact stator magnet 120, stator magnet 122, or some other portion of stator 102 in either of the latched positions. It should also be appreciated that the term "magnet" as used in this application should be understood in a broad sense as any body having magnetic dipoles, whether natural or induced. Thus, the term "magnet" includes a body, such as an iron pole piece, that is coupled to a permanent magnet and generates a magnetic field. The term "magnet" also encompasses a region or portion of a body that is so coupled.

When rotor 104 is in the intermediate position (FIG. 4), rotor magnet 120 is equidistant from stator magnet 122 and stator magnet 124. Thus, at this position, the magnetic forces acting on rotor 104 are substantially balanced, and rotor 104 is not magnetically biased toward either latched position. At any other rotational position, however, rotor 104 will be magnetically biased toward either the first or the second latched position. More specifically, rotor 104 will be magnetically biased toward the first latched position when rotor 104 is closer to the first latched position than to the second latched position (the distance between rotor magnet 120 and stator magnet 124 will be less than the distance between rotor magnet 120 and stator magnet 122). As rotor 104 rotates closer to the first latched position, the distance between rotor magnet 120 and stator magnet 124 will decrease, and the force of attraction between magnet 120 and magnet 124 will grow increasingly stronger. When rotor 104 has rotated fully into the first latched position, the force of magnetic attraction between rotor magnet 120 and stator magnet 124 will be at its greatest and sufficient to prevent rotor 104 from rotating back under the influence of pivot mechanism 106 toward the second latched position. Conversely, as rotor 104 nears the second latched position and the force of attraction between magnet 120 and magnet 122 will grow increasingly stronger. When rotor 104 has rotated fully into the second latched position, the force of attraction between rotor magnet 120 and magnet 124 will be at its greatest and sufficient to prevent rotor 104 from rotating under the influence of pivot mechanism 106 toward the first latched position. Thus, when rotated into either the first or second latched position, rotor 104 will be secured thereat by magnetic forces and may not rotate under the influence of pivot mechanism 106 toward the other latched position until released in the manner described below.

Rotor 104 may be released from a latched position in either of two ways: (1) by applying an additional force to rotor 104 in the direction of the other latched position, or (2) by lessening the force of magnetic attraction between rotor magnet 120 and the adjacent stator magnet. In preferred embodiments described more fully below, the inventive latch assembly is configured to implement the later strategy, possibly in conjunction with the first. As will be seen, this may be accomplished by disposing one or more control coils around one or more of the rotor magnets and/or a plurality of the stator magnets. When current is delivered to the control coil (or coils), a magnetic field is generated that decreases the force of attraction between the magnet to which the coil is coupled and any neighboring magnets or ferromagnetic bodies. This temporary reduction in the force of magnetic attraction permits actuator 104 to rotate under the influence of pivot mechanism 106 toward the other latched position. Unlike known latch assemblies, the inventive latch assembly is configured such that two magnetic flux paths are provided: a first magnetic path along which the flux emitted by the permanent magnets passes, and a second magnetic path along which the flux generated by the control coils passes. As will be seen, by providing an independent path for the flux generated by the control coils, the reluctance of the control coil path is significantly reduced. This results in less power being required to decrease the magnetic latching force and release the rotor from a latched position.

Referring still to FIGS. 1-5, first and second control coils may be associated with stator magnets 122 and 124, respectively, though the precise disposition of these control coils will be left for further discussion below. The control coils may be selectively energized to diminish the magnet latching force and release rotor 104 from a latched position. For example, if rotor 104 is currently secured at the first latched position (FIGS. 1 and 3) by the magnetic interaction between stator magnet 120 and rotor magnet 124, rotor 104 may be released from this position by providing a current to the control coil associated with stator magnet 124 to reduce the net force of attraction between magnets 120 and 124 and thus to permit rotor 104 to rotate under the influence of pivot mechanism 106 toward the second latched position (FIGS. 2 and 5). When rotor 104 nears the second latched position, the force of attraction between stator magnet 120 and rotor magnet 122 provides the additional energy to rotate rotor 104 fully into the second latched position and secures rotor 104 thereat. Rotor 104 remains latched at the second latched position until the second control coil associated with stator magnet 122 is energized.

Figure 7:
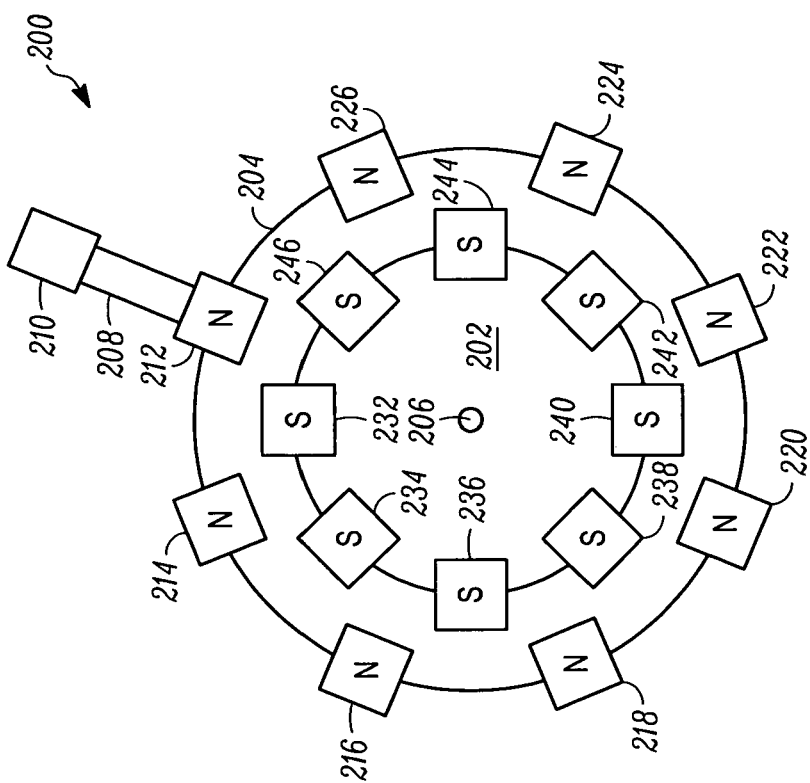
FIGS. 6-8 are functional top views of a magnetic latch assembly in a first latched position, an intermediate rotational position, and a second latched position, respectively.
Figure 6:
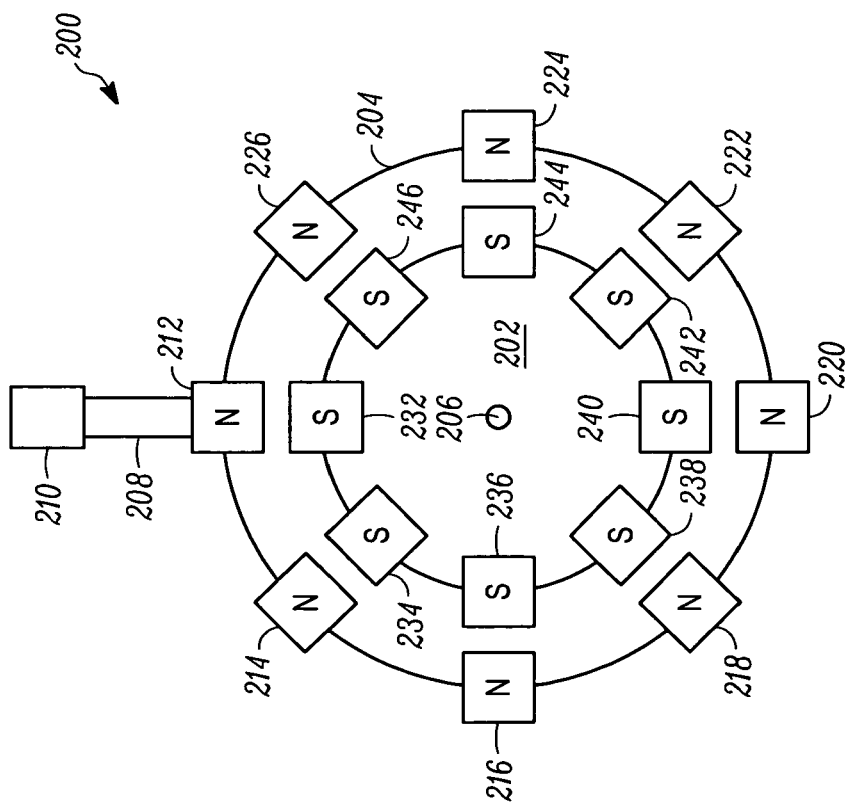
Figure 8:
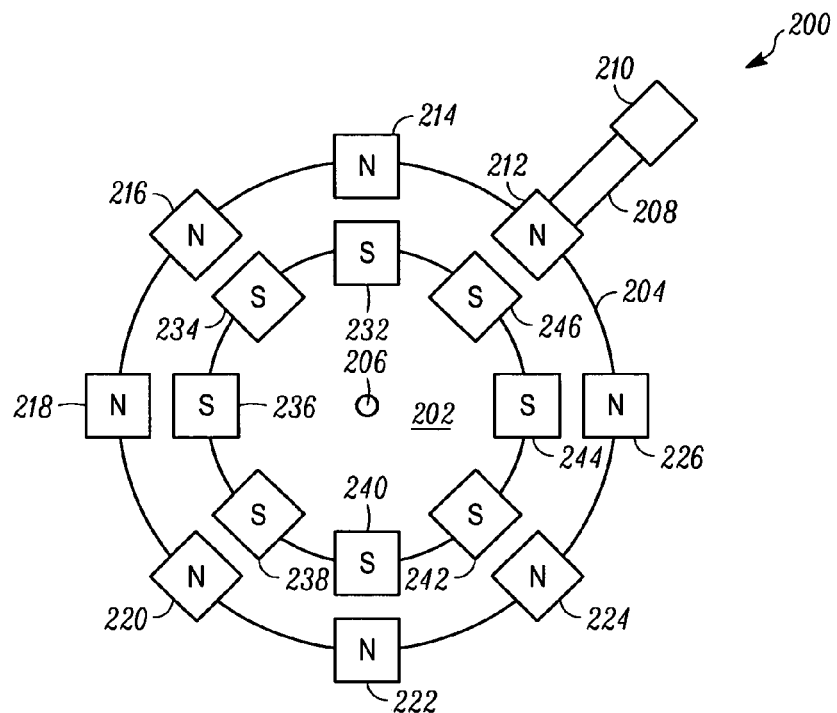

FIGS. 6-8 are functional top views of a magnetic latch assembly 200 in a first latched position, an intermediate rotational position, and a second latched position, respectively. As does previously-described latch assembly 100, latch assembly 200 comprises a stator 202 and a rotor 204. However, in latch assembly 200, stator 202 and rotor 204 are generally cylindrical in shape, and rotor 204 includes an inner surface defining a generally cylindrical cavity into which stator 202 is disposed. As was previously the case, rotor 204 comprises a spring-biased pivot shaft 206 and an actuator arm 208 having an optical element 210 coupled to an end thereof. Rotor 204 further comprises a plurality of rotor magnets angularly dispersed around a perimeter thereof. As can be seen in FIGS. 6-8, rotor 204 is provided with eight such magnets (i.e., rotor magnets 212, 214, 216, 218, 220, 222, 224, and 226), which are disposed around the inner surface of rotor 204 at approximately forty five degree intervals relative to the longitudinal axis of pivot shaft 206 (i.e., the rotational axis). Similarly, stator 202 is provided with eight stator magnets (i.e., stator magnets 232, 234, 236, 238, 240, 242, 244, and 246), which are disposed around an outer surface of stator 202 at approximately forty five degree intervals relative to the rotational axis. The stator magnets and the rotor magnets are positioned so as to be magnetically attracted to one another. For example, as illustrated in FIGS. 6-8, the rotor magnets may be positioned such that their poles reside opposite the poles of the stator magnets.

Rotor 204 rotates around stator 202 and about the rotational axis between a first latched position (FIG. 6) and a second-latched position (FIG. 8). When in the first latched position (FIG. 6), rotor magnets 212, 214, 216, 218, 220, 222, 224, and 226 are substantially adjacent stator magnets 232, 234, 236, 238, 240, 242, 244, and 246, respectively. When in the second latched position (FIG. 8), rotor 104 has rotated clockwise by approximately forty five degrees, and rotor magnets 212, 214, 216, 218, 220, 222, 224, and 226 are substantially adjacent stator magnets 246, 232, 234, 236, 238, 240, 242, and 244, respectively. Latch assembly 200 operates in much the same way as does assembly 100 described above; that is, a spring-biased pivot mechanism biases rotor 204 toward the intermediate rotational position (FIG. 7), while the stator and rotor magnets bias rotor 204 toward the first latched position (FIG. 6) when rotor 204 is between the intermediate rotational position and the first latched position, and toward the second latched position (FIG. 8) when rotor 204 is between the intermediate rotational position and the second latched position. When rotor 204 approaches a latched position under the rotational influence of the pivot mechanism, magnetic latching forces provide the energy to fully rotate rotor 204 into the latched position and secure rotor 204 thereat. As has been briefly described above, and as will be more fully described below, rotor 204 may be released from the first or second latched position by energizing one or more control coils associated with one or more of the stator magnets and/or one or more of the rotor magnets.

Figure 9:
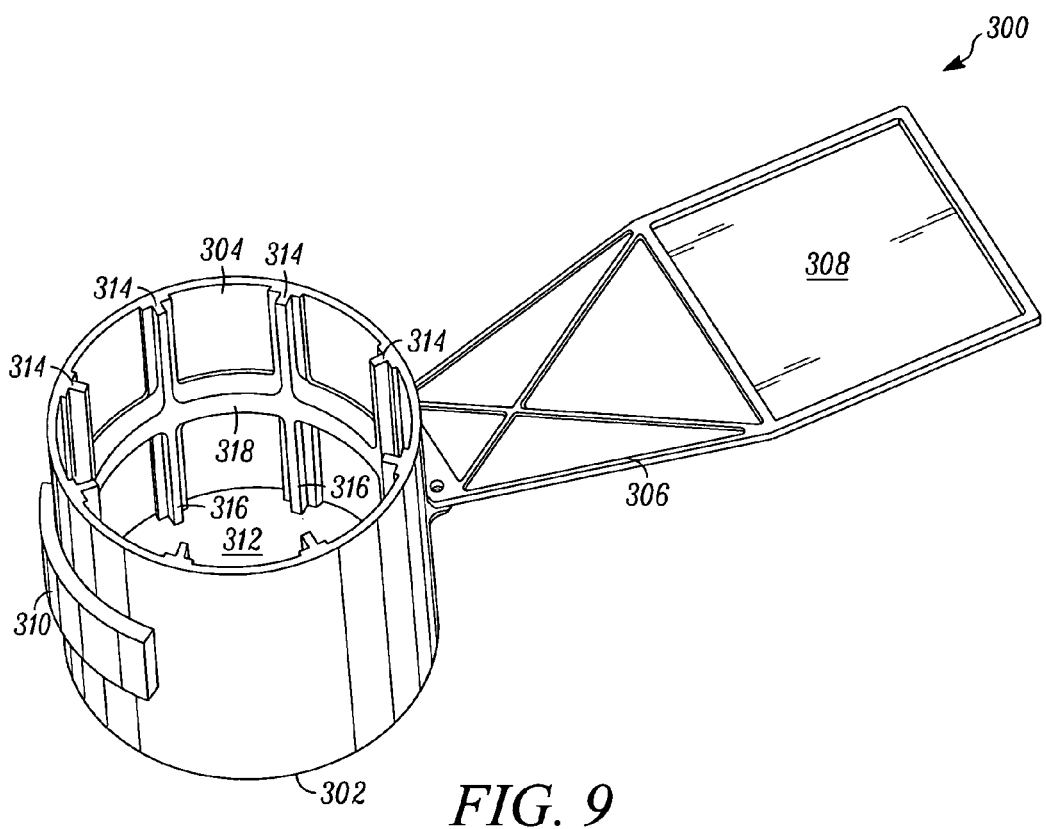
FIG. 9 is an isometric view of a rotor in accordance with a first embodiment of the present invention.
Figure 10:
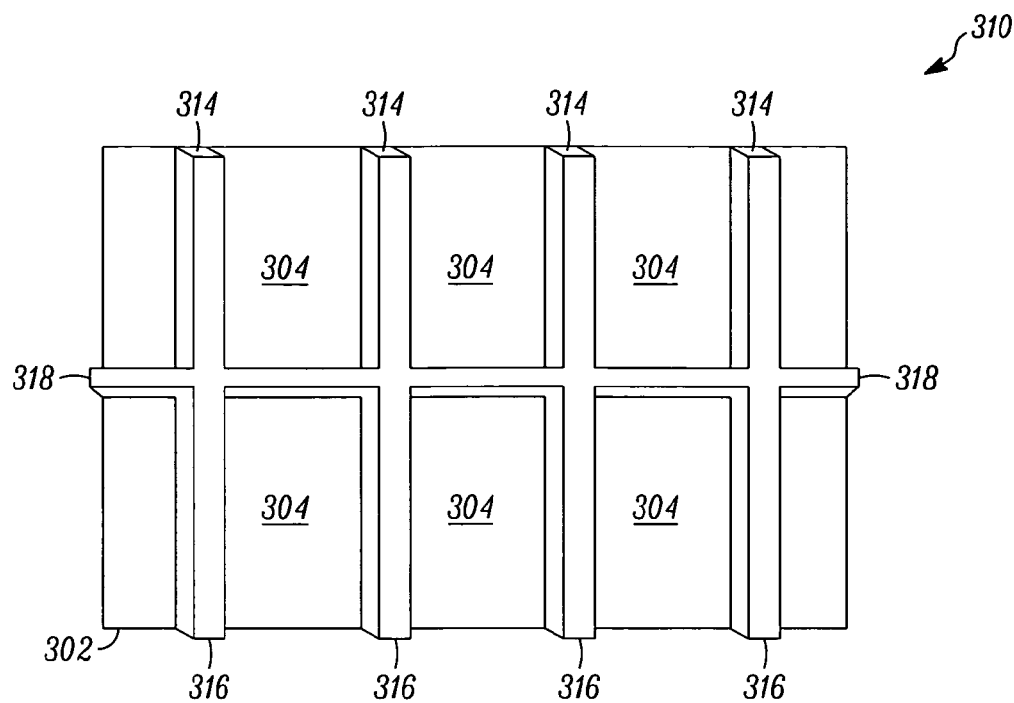
FIG. 10 is an isometric view of a portion of the rotor shown in FIG. 9 in an unfurled state.

FIG. 9 is an isometric view of a rotor 300 in accordance with a first embodiment of the present invention. Rotor 300 comprises a body 302, which has an inner surface 304, and an actuator arm 306, which is fixedly coupled to body 302 at first end thereof and to an optical element 308 at a second end thereof. A counterweight 310 is also fixedly coupled to body 302 opposite arm 306 to help balance arm 306 and element 308 so as to minimize system disturbances (e.g., vibrations) as rotor 300 rotates between latched positions. Inner surface 304 defines a cavity 312 through body 302 that has a generally cylindrical geometry. Cavity 312 is configured to receive a stator of the type described below in conjunction with FIGS. 11-15. A network of raised veins is provided along inner surface 304 and configured to attract (or be attracted by) magnetic regions of the stator. As shown in FIG. 9 and also in FIG. 10 (an isometric view of a portion of rotor 300 in an unfurled state) this network may take the form of a lattice comprising a plurality (e.g., ten) of upper longitudinal veins 314, a plurality (e.g., ten) of lower longitudinal veins 316, and an equatorial vein 318, which connects veins 314 to veins 316; however, only four of upper veins 314, four of lower veins 316, and a portion of longitudinal vein 316 is illustrated in FIG. 10 for clarity. During the operation of a magnetic switch assembly in which rotor 300 is employed, body 302 remains magnetically neutral due to its relatively low reluctance. As illustrated in FIGS. 9 and 10, veins 314, 316, and 318 may each simply comprise a ferromagnetic material (e.g., iron) that is attracted to a magnetic region provided on a stator disposed as described below in conjunction with FIGS. 11-15. As will be explained more fully below, rotor 300 is configured to cooperate with a stator disposed within cavity 312 to provide (1) a first magnetic flux path for permanent magnetic flux, which biases and secures the rotor at the latched positions as described above; and (2) a second magnetic flux path for the flux generated when one or more control coils (described below) are energized. The two paths are substantially opposite in veins 314 and 316 and share a region proximate equatorial vein 318. Thus, when the control coils are energized the flux generated thereby opposes the flux passes along the first flux path in veins 314 and 316 and thus reduces the magnetic latching force, which releases rotor 300 from a latched position. At the same time, the magnetic flux and central flux are additive in equatorial vein 318, but produce no net torque. By providing two flux paths in this manner, the inventive switch assembly lowers the reluctance of the second control flux path and thus decreases the amount of power that must be delivered to the coils to release rotor 300 from a latched position.

Figure 11:
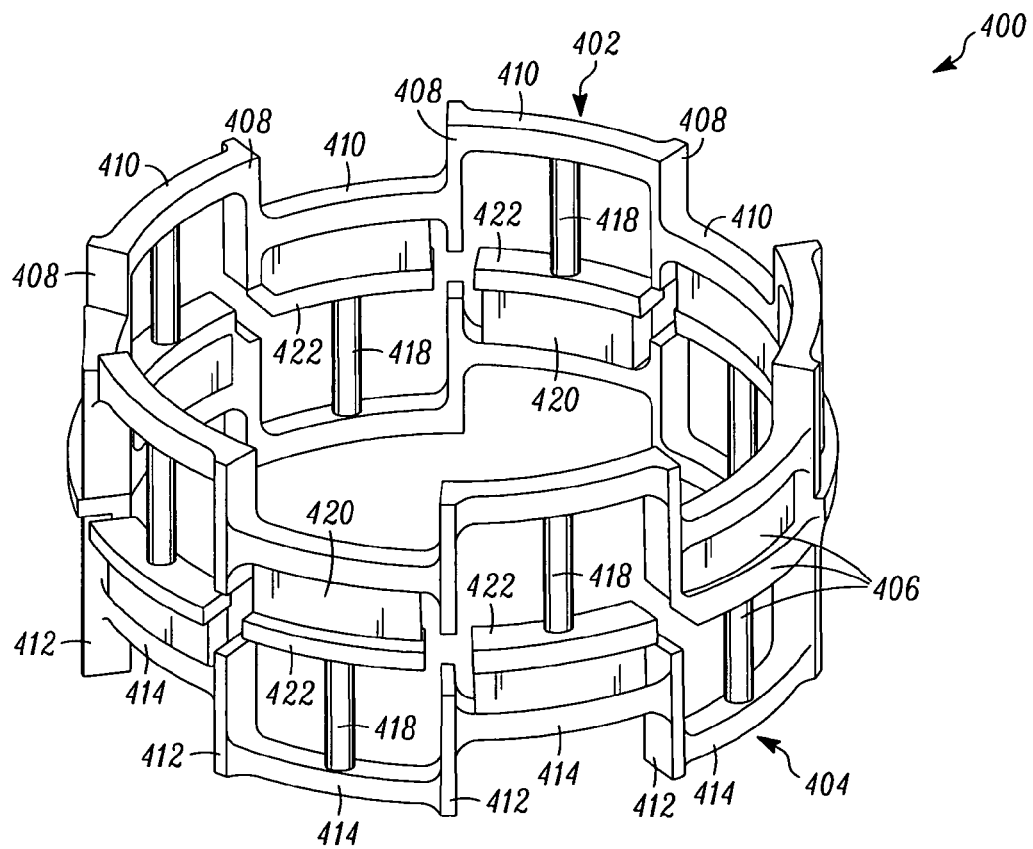
FIG. 11 is an isometric view of a stator suitable for use in conjunction with the rotor shown in FIG. 9 in accordance with a first embodiment of the present invention.

FIG. 11 is an isometric view of a stator 400 suitable for use with rotor 300 (i.e., disposal within cavity 312 of rotor 300) in accordance with a first embodiment of the present invention. A portion of stator 400 is further shown in an unfurled state in FIG. 12. Stator 400 comprises an upper, generally cylindrical pole body 402 and a lower, generally cylindrical pole body 404, which is fixedly coupled to pole body 402 via a series of connector assemblies 406 as described below. Pole body 402 comprises a plurality of vertical teeth 408 that are connected by way of a plurality of horizontal ties 410. As may be most easily appreciated by referring to FIG. 11, vertical teeth 408 extend radially outward from stator 400 relative to horizontal ties 410. When stator 400 is disposed within cavity 312 of rotor 300 (FIGS. 9 and 10), teeth 408 are configured to align with and nearly contact upper veins 314 when rotor 300 is in a latched position. In contrast, ties 410 are recessed relative to teeth 408 and are therefore separated from upper veins 314 at all rotational positions by a relatively large gap. By disposing ties 410 and teeth 408 in this manner, the magnetic interaction between ties 410 and upper veins 314 is minimized at all rotational positions, while magnetic interaction between teeth 408 and veins 314 when rotor 300 is facilitated in a latched position.

Pole body 404 is substantially identical to pole body 402, though its disposition within stator 400 varies from that of pole body 402 (pole body 404 has an inverted and slightly rotated disposition relative to pole body 402). Pole body 404 comprises a plurality of vertical teeth 412 that are connected by way of a plurality of horizontal ties 414, which are disposed within stator 400 in the same manner as teeth 408 and ties 410. When stator 400 is disposed within cavity 312, teeth 412 and ties 414 are positioned proximate lower veins 316 of rotor 300 (FIGS. 9 and 10). Again, teeth 412 align with, and extend radially outward to nearly contact, lower veins 316 when rotor 300 is in either the first or the second latched position. In contrast, ties 414 are recessed and remain separated from veins 316 by a relatively large gap at all rotational positions. As was the case previously, this configuration minimizes magnetic interaction between ties 414 and lower veins 316 at all rotational positions, while facilitating magnetic interaction between teeth 412 and veins 316 when rotor 300 is in a latched position.

Figure 12:
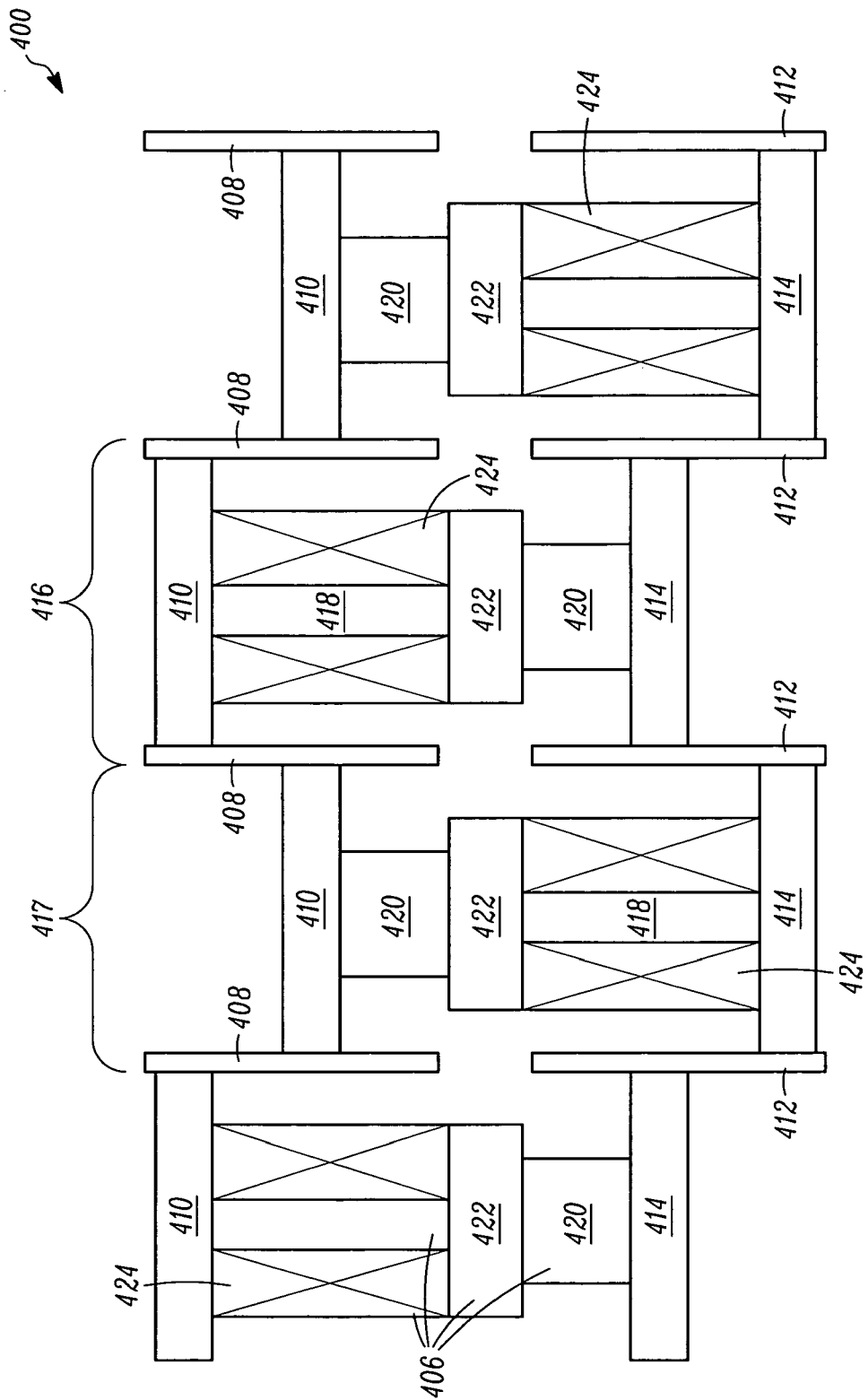
FIG. 12 is a side view of a portion of the stator shown in FIG. 11 in an unfurled state.

As stated above, pole body 404 is fixedly coupled to pole body 402 by a series of connector assemblies 406. Connector assemblies 406 each comprise a rod 418 (e.g., a ferromagnetic material, such as iron), a magnet 420, and an equatorial pole piece 422 (e.g., a ferromagnetic material, such as iron), which is fixedly coupled between rod 418 and magnet 420 and which extends radially outward to nearly contact equatorial vein 318 when stator 400 is disposed within cavity 312 of rotor 300. For ease of explanation, it is helpful to discuss stator 400 as divided into multiple (e.g., ten) sections, each of which includes a connector assembly 406, a portion of pole body 402 (i.e., a vertical tooth 408 and a horizontal tie 410), and a portion of pole body 404 (i.e., a vertical tooth 412 and a horizontal tie 414). As can be seen in FIG. 12, which illustrates only four such sections for clarity, the stator sections alternate between a first assembly 416 and a second assembly 417. In assembly 416 (leftmost in FIG. 12), an upper horizontal tie 410 is connected to a first neighboring tooth 408 at an upper portion thereof, while a lower horizontal tie 414 is connected to a second neighboring tooth 412 at a medial portion thereof. Also in assembly 416, a rod 418 is coupled to upper tie 410, while a magnet 420 is coupled to lower tie 414. The second assembly 417 (rightmost in FIG. 12) is substantially an invert of assembly 416. That is, in assembly 417, an upper horizontal tie 410 is coupled to a first neighboring tooth 408 at a medial portion thereof, and a lower horizontal tie 414 is coupled to a second neighboring tooth 412 at a lower portion thereof. Additionally, a rod 418 is coupled to tie 414, and a magnet 420 is coupled to tie 410.

Referring still to FIG. 12, a control coil 424 is disposed around each rod 418 such that one end of coil 424 is proximate an equatorial pole piece 422 and the other end is proximate an upper tie 410 in assembly 416 or a lower tie 414 in assembly 417. Control coils 424 are coupled to a source of current (not shown) and are configured to generate a magnetic field when energized that reduces the net latching force between rotor 300 and stator 400. When the latching force is sufficiently reduced, rotor 300 may rotate under the influence of a spring-biased pivot mechanism (or other biasing means) toward the opposite latched position in the manner described above. A detailed discussion of the way in which control coils 424 generate a magnetic field that generally counters that produced by magnets 420 is provided below; however, before embarking on that discussion, it will be helpful to first describe the disposition of stator 400 relative to rotor 300 at various rotational positions.

Figure 13:
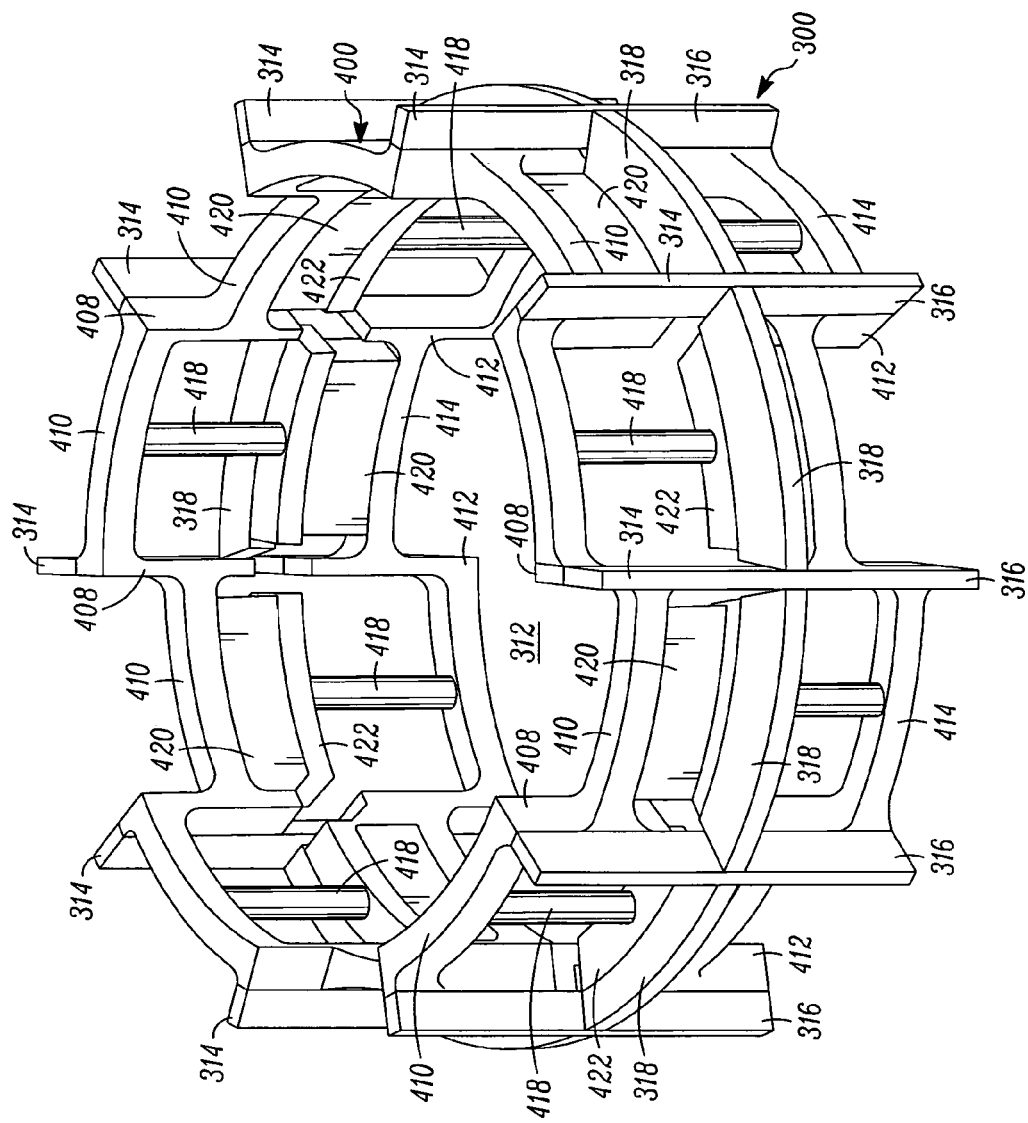
FIG. 13 is an isometric cutaway view of the stator shown in FIGS. 10-14 having the rotor shown in FIGS. 8 and 9 disposed therearound.

FIG. 13 is an isometric cutaway view of stator 400 disposed within cavity 312 of rotor 300 when rotor 300 is in a first latched position. It is to be noted that only a portion of rotor 300 is illustrated in FIG. 13 (i.e., upper veins 314, lower veins 316, and equatorial vein 318) and that body 302, weight 310, actuator arm 306, optical element 308, and control coils 424 are not shown for clarity. As will be recalled, rotor 300 is configured to rotate around stator 400 and about the rotational axis between the first and second latched positions. In the first latched position shown in FIG. 13, each tooth 408 and 412 aligns with a particular vein 314 and 316, respectively. In the second latched position (i.e., when rotor 300 has rotated 36 degrees clockwise), each tooth 408 and 412 aligns with a different vein 314 and 316, respectively. As described previously, teeth 408 and 412 extend radially outward from stator 400 to nearly contact veins 314 and 316 when rotor 300 is in either latched position. Therefore, when rotor 300 is in a latched position, only a relatively small spatial gap exists between the teeth of stator 400 and the veins of rotor 300 and magnetic flux may easily pass there between. More specifically, flux may pass from upper teeth 408 to upper veins 314 and from lower teeth 412 to lower veins 316. In contrast, when rotor 300 is not in a latched position, teeth 408 and 412 do not align with respective veins 314 and 316, and magnetic flux may not readily pass there between. The further rotor 300 is from a latched position, the larger the spatial gap between the teeth of stator 400 and the veins of rotor 300, and the less magnetic flux will pass from upper teeth 408 to upper veins 314 and from lower teeth 412 to lower veins 316. As a result of this configuration, rotor 300 will be magnetically biased toward the first or second latched position in the manner described above.

As mentioned previously, equatorial pole pieces 422 each extend radially outward to nearly contact equatorial vein 318 when stator 400 is disposed within cavity 312 of rotor 300. Unlike teeth 408 and 412, which extend radially outward to nearly contact respective veins 314 and 316 only when rotor 300 is in a latched, pole pieces 422 nearly contact equatorial vein 318 in all rotational positions. Considering this, it may be appreciated that the network of veins disposed on rotor 300 functions as a type of magnetic drawbridge. When rotor 300 is not in a latched position, only equatorial pole pieces 422 will reside near equatorial vein 318, and very little magnetic flux will flow between rotor 300 and stator 400. However, when rotor 300 is in (or proximate) a latched position, equatorial pole pieces 422 will reside near equatorial vein 318, upper teeth 418 will reside near upper veins 318, and lower teeth 412 will reside near lower veins 316. This disposition provides multiple flux paths along which magnetic flux may flow between rotor 300 and stator 400 as described in detail in the following paragraph.

Figure 14:
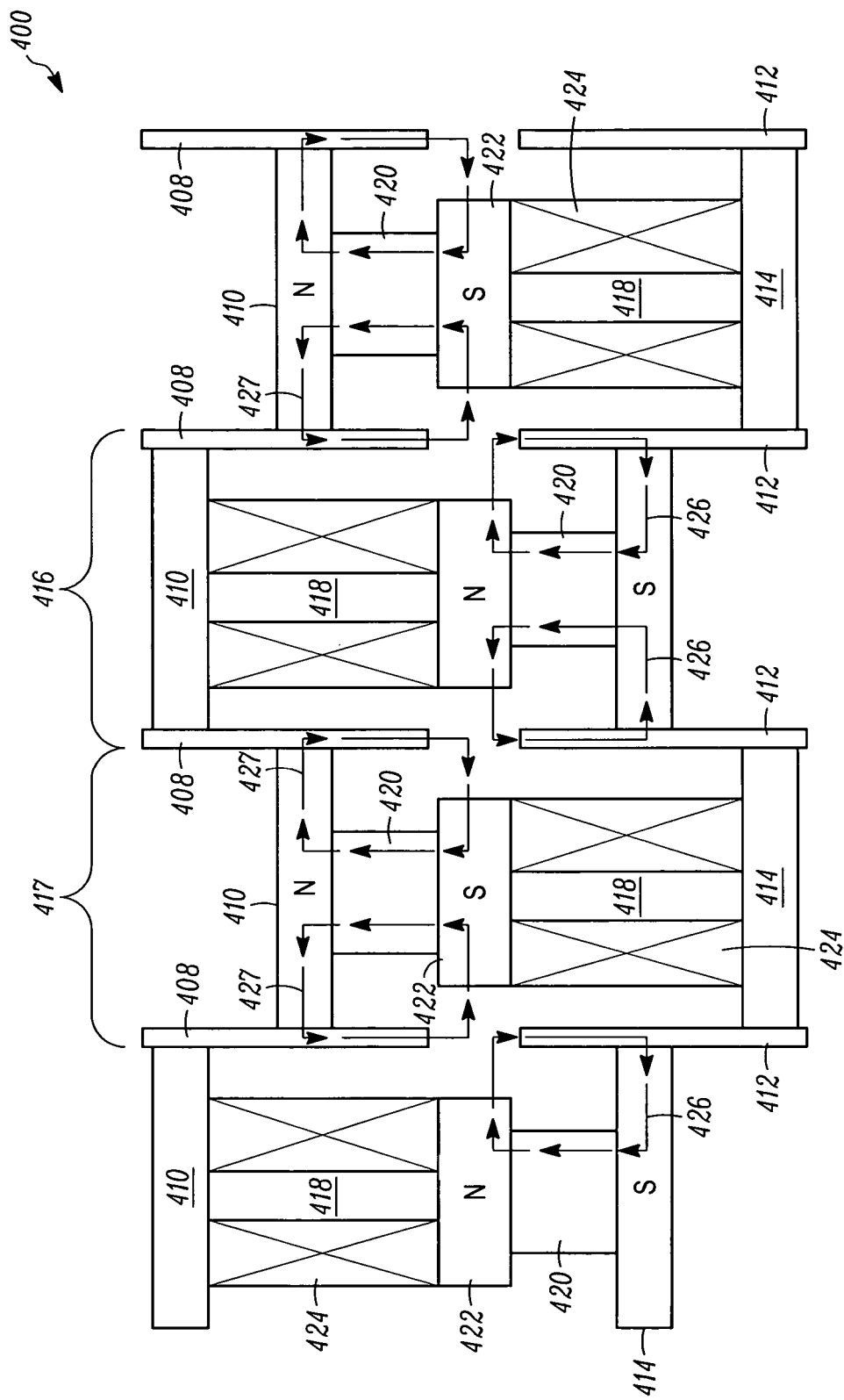
FIGS. 14 and 15 are side views of the stator shown in FIG. 11 illustrating the path of magnetic flux in normal and energized states, respectively.

FIG. 14 is a side view of a portion of stator 400 in an unfurled state illustrating the flux paths when rotor 300 (not shown) is in a latched position. In assembly 416, magnet 420 is disposed such that equatorial pole piece 422 assumes a northern polarity, while tie 414 and teeth 412 assume a southern polarity. Magnetic flux produced by magnet 420 follows two flux paths 426 from the north pole to the south pole in the following manner. First, flux emitted by magnet 420 passes through equatorial pole piece 422 to equatorial vein 318 on rotor 300 (FIGS. 9, 10, and 13). Within rotor 300, the flux paths continue from equatorial vein 318 to lower longitudinal veins 316. The flux then passes from veins 316 back into stator 400 via lower teeth 412. Finally, the flux passes from teeth 412 through tie 414 to magnet 420.

In the second assembly 417 (FIG. 14), magnet 420 is disposed such that equatorial pole piece 422 assumes a southern polarity, while tie 410 and teeth 408 assume a northern polarity. Magnetic flux produced by magnet 420 passes from the north pole to the south pole along two flux paths 427 from in the following manner. First, the flux emitted from magnet 420 flows through tie 410 to upper teeth 408 adjacent to tie 410. From upper teeth 408, the magnetic flux passes through upper longitudinal veins 314 on rotor 300 (FIGS. 9, 10, and 13) and, subsequently, to equatorial vein 318. The flux then passes from equatorial vein 318 on rotor 300 to equatorial pole piece 422, and thus back to stator 400, before returning to magnet 420.

As stated above, due to the polarity of ties 410 and pole pieces 422 in assembly 416, lower teeth 412 will assume a southern polarity. Conversely, due to the polarity of ties 414 and pole pieces 422 in assembly 417, upper teeth 408 will assume a northern polarity. As a result, veins 314 and 316 will be magnetically attracted to teeth 408 and 412, respectively, and rotor 300 will be magnetically biased toward the latched positions whereat the veins and teeth align. When in a latched position, a relatively large amount of flux will pass through flux paths 426 and 427 and the magnetic interaction between rotor 300 and stator 400 will be at its greatest. At such a latched position, the magnetic interaction will be sufficient to prevent rotor 300 from rotating under the influence of the spring-biased pivot mechanism as described above. Rotor 300 will remain in the latched position until the magnetic interaction between rotor 300 and stator 400 is decreased by energizing one or more of control coils 424 as described in the following paragraphs.

Figure 15:
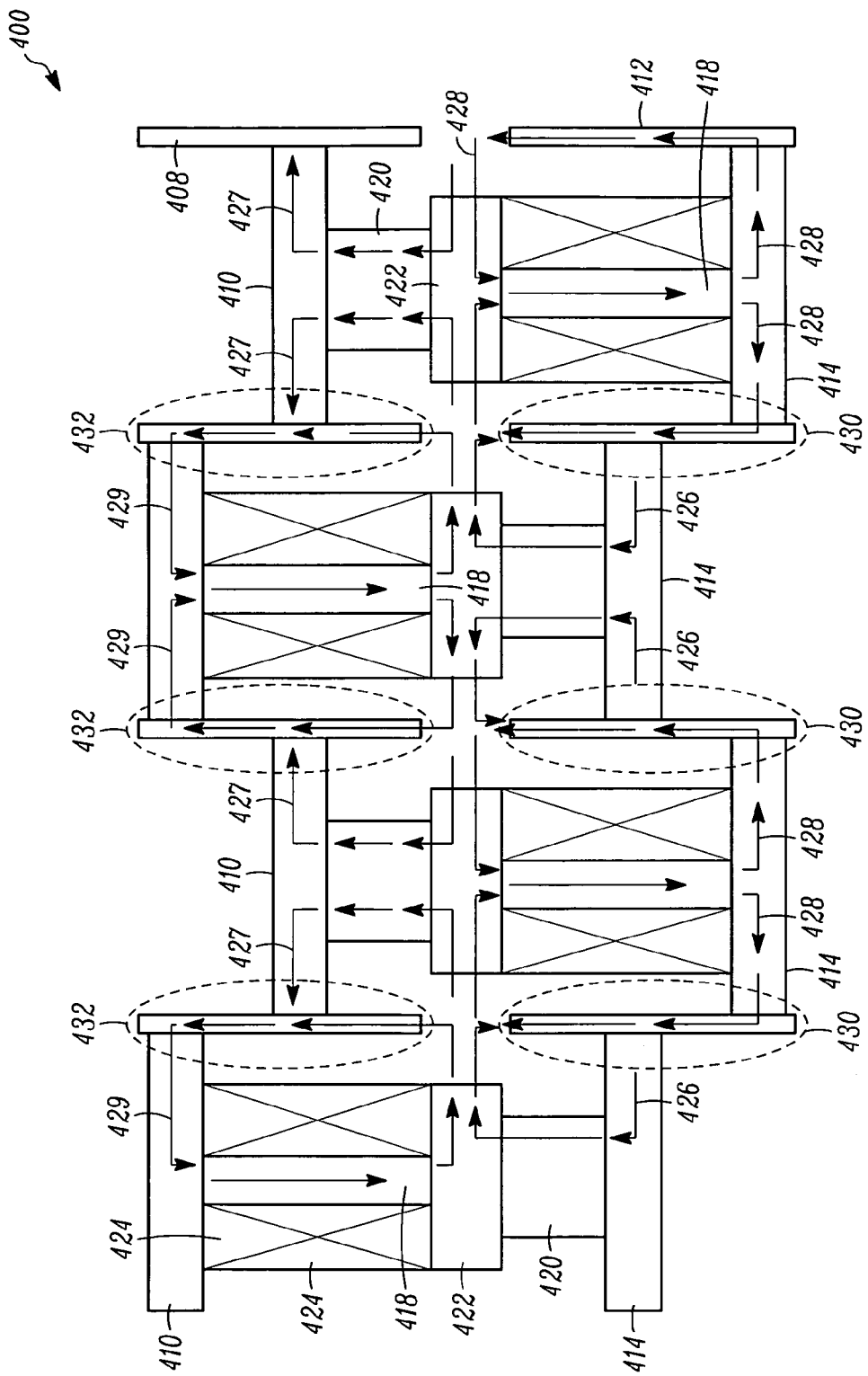

FIG. 15 is a side view of a portion of stator 400 in an unfurled state that illustrates the magnetic flux path when (1) rotor 300 (not shown) is in a latched position and (2) at least one of a plurality of control coils 424 has been energized. Coils 424 are configured to induce magnetic fields within rods 418 that oppose the magnetic fields produced by magnets 420. For example, in assembly 416, the magnetic flux induced within rod 418 by coil 424 passes along two flux paths 429 in the following manner. First, control flux paths 429 pass from rod 418 to equatorial pole piece 422 on stator 400 and, thereafter, to equatorial vein 318 on rotor 300. From equatorial vein 318, control flux paths 429 pass to longitudinal veins 314 and, thereafter, to upper teeth 408, thus returning to the stator. Flux paths 429 then continue from teeth 408 through tie 410 and return to rod 418. It should thus be appreciated that the direction of control flux paths 429 is substantially opposite that of paths 427. As indicated in FIG. 15 at 432, a portion of paths 429 coincide with a portion of paths 427. In particular, paths 429 remains generally separate from paths 427, except for a series of shared regions, which may be, for example, along the face of each of teeth 408. The shared regions are preferably proximate the area where the magnetic latching force is largely generated. By disposing paths 427 and 429 in this way, the reluctance of paths 427 may be minimized while still permitting the magnetic field produced by coil 424, when energized, to reduce the magnetic force of attraction between upper teeth 408 and upper veins 314 and, consequently, between stator 400 and rotor 300. By reducing the reluctance of paths 427, less power need be delivered to coil 424 to release rotor 300 from either latched position and, consequently, the inventive magnetic latch assembly will operate with more efficiency.

Referring now to assembly 417, the control flux emitted by coils 424 travels control flux paths 428 as follows. First, control flux paths 428 pass from rod 418 through tie 414 to teeth 412. From teeth 412, control flux paths 428 travel to lower longitudinal veins 316 provided on rotor 300 (FIGS. 9, 10, and 13) and, then, to equatorial vein 318. Lastly, flux paths 428 pass from vein 318 to pole piece 422 and return to rod 418. As was the case previously with flux paths 427 and 429, flux paths 426 and 428 generally oppose each other at overlapping portions, which may be, for example, along the face of each of teeth 412 (indicated in FIG. 15 at 430). Again, by providing two types of flux paths, one for the control flux produced by coils 424 and the other for the flux produced by magnet 420, the inventive switch assembly lowers the reluctance of the control flux path and thus decreases the amount of power that must be delivered to the coils 424 to release rotor 300 from a latched position.

In view of the above, it should be appreciated that there has been provided an energy-efficient magnetic switch assembly (e.g., an optical switch assembly) that requires less power to release an actuator arm from a latched position. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and assembly of elements without departing from the scope of the invention as set forth in the appended claims and the legal equivalents thereof.

What is claimed is:

1. A bi-stable magnetic switch assembly, comprising:
   a stator, comprising;
      a plurality of upper radial teeth; and
      a plurality of lower radial teeth fixedly coupled to said plurality of upper radial teeth;
   a rotor configured for rotation with respect to said stator between a first latched position and a second latched position, said rotor comprising;
      a series of upper veins aligning with said plurality of upper radial teeth in the first latched position and in the second latched position; and
      a series of lower veins fixedly coupled to the series of upper veins, said series of lower veins aligning with said plurality of lower radial teeth in the first latched position and in the second latched position;
   a spring coupled to said stator for biasing said rotor toward the second latched position;
   at least one magnet fixedly coupled to one of said stator and said rotor, said magnet configured to produce a magnetic latching force sufficient to maintain the rotor in the first latched position; and
   at least one coil fixedly coupled to said stator and configured to selectively generate a magnetic flux when energized to reduce the magnetic latching force and permit said rotor to rotate into the second latched position.

2. A switch assembly according to claim 1 further comprising an arm coupled to said rotor and having an optical element fixedly coupled thereto, said arm positioning said optical element within an optical path when said rotor is in the first latched position and outside of the optical path when said rotor is in the second latched position.

3. A switch assembly according to claim 1 wherein said rotor comprises a cavity therethrough and wherein said stator is disposed within said cavity.

4. A switch assembly according to claim 1 wherein said stator further comprises a plurality of equatorial pole pieces disposed between said plurality of upper radial teeth and said plurality of lower radial teeth.

5. A switch assembly according to claim 4 wherein said rotor further comprises an inwardly protruding equatorial vein, said plurality of equatorial pole pieces substantially aligning with said equatorial vein.

6. A switch assembly according to claim 4 wherein said at least one magnet comprises a plurality of permanent magnets each coupled to a different one of said equatorial pole pieces.

7. A switch assembly according to claim 5 wherein said at least one coil comprises a plurality of coils each coupled to a different one of said equatorial pole pieces.

8. A switch assembly according to claim 7 wherein said stator further includes a plurality of ferromagnetic rods each having one of said plurality of coils disposed therearound.

9. A switch assembly according to claim 8 wherein said stator further comprises an upper stator portion and a lower stator portion, and wherein said plurality of ferromagnetic rods comprises a first group of rods each having a first end coupled to said upper stator portion and a second end coupled to a different one of said equatorial pole pieces, and a second group of rods each having a first end coupled to said lower stator portion and a second end coupled to a different one of said equatorial pole pieces.

10. A switch assembly according to claim 9 wherein said at least one magnet comprises a first plurality of permanent magnets each having a first end coupled to said lower stator portion and a second end coupled to a different one of said equatorial pole pieces having said first group of rods coupled thereto, and a second plurality of permanent magnets each having a first end coupled to said upper stator portion and a second end coupled to a different one of said equatorial pole pieces having said second group of rods coupled thereto.

11. A bi-stable magnetic switch assembly, comprising:
   a stator, comprising;
      a plurality of upper radial teeth; and
      a plurality of lower radial teeth fixedly coupled to said plurality of upper radial teeth;
   a rotor configured for rotation with respect to said stator between a first latched position and a second latched position, said rotor comprising:
      a series of upper veins aligning with said plurality of upper radial teeth in the first latched position and in the second latched position; and
      a series of lower veins fixedly coupled to said series of upper veins, said series of lower veins aligning with said plurality of lower radial teeth in the first latched position and in the second latched position;
   a spring coupled to said stator for biasing said rotor toward the second latched position when said rotor is in the first latched position;
   a plurality of permanent magnets configured to produce a magnetic latching force for securing said rotor at the first latched position; and
   a plurality of electromagnets each fixedly coupled to said stator and configured to reduce the magnetic latching force when energized to release said rotor from said first latched position and permit said rotor to rotate into said second latched position.

12. A switch assembly according to claim 11 further comprising an arm coupled to said rotor and having an optical element fixedly coupled thereto, said arm positioning said optical element within an optical path when said rotor is in the first latched position and outside of the optical path when said rotor is in the second latched position.

13. A switch assembly according to claim 11 wherein said rotor comprises a cavity therethrough and wherein said stator is disposed within said cavity.

14. A switch assembly according to claim 11 wherein said stator further comprises a plurality of equatorial pole pieces disposed between said plurality of upper radial teeth and said plurality of lower radial teeth.

15. A switch assembly according to claim 14 wherein said plurality of permanent magnets are each coupled to a different one of said equatorial pole pieces.

* * * * *